United States Patent [19]
Masuda

[11] Patent Number: 6,141,080
[45] Date of Patent: *Oct. 31, 2000

[54] CONTROL NEGATIVE FOR USE IN SETTING UP EXPOSURE CONDITION OF PHOTO-PRINTER

[75] Inventor: Ken Masuda, Tokyo, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/679,750

[22] Filed: Jul. 10, 1996

[30] Foreign Application Priority Data

| Jul. 12, 1995 | [JP] | Japan | 7-176407 |
| Jul. 12, 1995 | [JP] | Japan | 7-176408 |
| Jul. 12, 1995 | [JP] | Japan | 7-176409 |
| Jul. 12, 1995 | [JP] | Japan | 7-176410 |

[51] Int. Cl.⁷ ................................................ G03B 27/85
[52] U.S. Cl. ............................................................ 355/38
[58] Field of Search ..................................... 355/35, 38, 71

[56] References Cited

U.S. PATENT DOCUMENTS

| 3,685,900 | 8/1972 | Kirby et al. | 355/32 |
| 3,718,074 | 2/1973 | Davis | 95/1.1 |
| 4,657,378 | 4/1987 | Hope et al. | 355/38 |
| 4,812,879 | 3/1989 | Suzuki | 355/38 |
| 5,245,383 | 9/1993 | Matsushita et al. | 355/38 |
| 5,262,821 | 11/1993 | Hosoya | 355/35 |
| 5,671,041 | 9/1997 | Iwaki | 355/38 |
| 5,745,215 | 4/1998 | Miyauchi et al. | 355/38 |
| 6,018,381 | 1/2000 | Vanderbrook et al. | 355/38 |

*Primary Examiner*—Russell Adams
*Assistant Examiner*—Christopher Mahoney
*Attorney, Agent, or Firm*—Sughrue, Mion, Zinn, Macpeak & Seas, PLLC

[57] ABSTRACT

A control negative has at least a frame which has a center eye portion reproducing a neutral gray on a reference print formed under optimum exposure conditions, and a background area consisting of a gray base portion and a plurality of color chips dispersed over the gray base portion. The gray base portion reproduces a neutral gray and each color chip has a specific color on the reference print. A couple of portraits are disposed on opposite horizontal sides of the center eye portion, to represent an upper and a lower limit of flesh tone on the reference print. A density control chart and a color control chart are disposed in the same horizontal center line as the center eye portion. The density control chart has white and gray areas disposed adjacent to each other. The color control chart has a gray area and a color scale consisting of a series of color segments. The color segments have color densities unbalanced by a constant degree from an equivalent neutral density of the gray area toward individual directions so as to have different hues from each other on the reference print.

21 Claims, 9 Drawing Sheets

CONTROL NEGATIVE FOR USE IN SETTING UP EXPOSURE CONDITION OF PHOTO-PRINTER

BACKGROUND OF THE INVENTION

1. Field of the Invention

The present invention relates to a control negative for use in setting a photo-printer to proper exposure conditions, prior to actual printing. More particularly, the present invention relates to a control negative which enables setting up proper exposure conditions in any kind of photo-printer without measuring three color densities of a sample print made from the control negative.

2. Background Art

An automatic photo-printer determines an appropriate print-exposure in accordance with three color densities of a negative to be printed, which are measured by an image scanner such as a CCD scanner mounted in the photo-printer. To achieve a homogeneous image quality, the exposure conditions in the photo-printer are checked prior to the practical printing to set up proper exposure conditions. This is because the exposure conditions can change according to the photo-printer type or changes in properties of the same photo-printer, or according to a difference in color characteristics among color papers or lenses used for printing.

For setting up proper exposure conditions for three colors in the photo-printer, first a sample print is made from a specific control negative (or called a set-up negative), without effecting any exposure correction to the photo-printer. Next, densities of three colors, such as yellow, magenta and cyan, of the sample print are measured by a density measurement device. Then, three color densities of a previously provided reference print made from the control negative under optimum exposure conditions in the factory or the photofinisher, are also measured by the density measurement device to detect a difference in density between the sample print and the reference print, color by color.

Generally, most original frames expected to be printed have been photographed under daylight, i.e., sunlight from 10 a.m. to 2 p.m., or under similar exposure conditions, at proper exposure values determined based on the film speed, so that most negatives have proper image densities. In addition, it is usual that a human subject occupies about one-third of the entire area of each negative frame, while the remaining area, i.e. the background is occupied by landscapes such as trees, sky, walls and so forth. In principle, mixture of three color transmittance densities of all pixels of a properly exposed negative results in a neutral gray.

Figure 13:
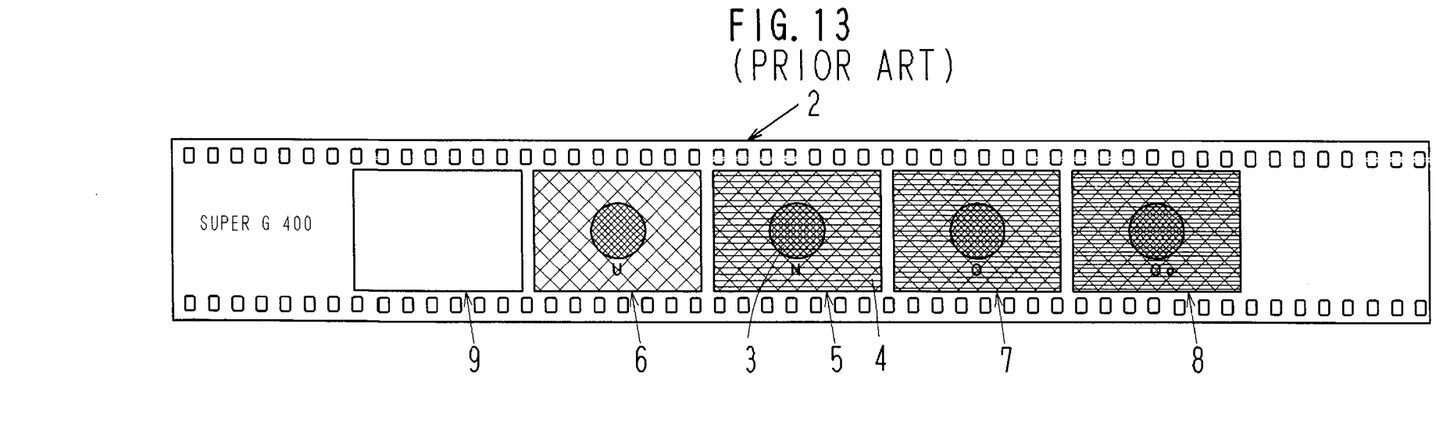
FIG. 13 shows an explanatory view of a conventional control negative kit.

Therefore, as a representative of ordinary negatives, conventional control negative kit 2 contains a round eye portion 3 in a center of the frame, wherein mixture of light bundles transmitting through the round eye portion 3 represent a neutral gray. A background 4 of a different color density surrounds the eye portion 3, as is shown in FIG. 13. Control negative frames 5 to 8 are photographed from the same original at different exposure values. The frame 5 is photographed at a normal exposure value, so is called a normal exposed frame. The frame 6 is photographed at an insufficient exposure value, so is called an under-exposed frame. The frame 7 is photographed at an excessive exposure value, so is called an over-exposed frame. The frame 8 is photographed at a greatly excessive exposure value, so is called a super over-exposed frame. The normal exposed frame 5 represents a standard original frame to be printed. Besides these control negative frames 5 to 8, there is provided a blank frame 9 with no image on the control negative kit 2 to show a basic density of the filmstrip used for the control negative kit 2.

According to the difference in three color densities between the sample print and the reference print, an exposure correction value is determined for any one of the three colors, and is entered through correction keys. In this way, the photo-printer is set to proper exposure conditions where a print made from the control negative would have the same density and color balance as the reference print. The density measurement device is usually incorporated in the photo-printer, to measure three color densities from a predetermined central area of the sample print or the reference print.

Thus, the conventional control negative with the center eye portion needs density measurement of the sample print, and is therefore inconvenient and inefficient.

It is also known to use a control negative which has a pictorial full-color image such as a portrait in place of the center eye portion, in order to enable the operation to determine with the naked eye if color balance and density of the sample print are proper or not.

However, it has been difficult to make an accurate determination based on the visual inspection of the pictorial image on the sample print made from the conventional control negative.

OBJECT OF THE INVENTION

In view of the foregoing, a prime object of the present invention is to provide a control negative which permits reliable visual inspection of a consequent photo-print on determining whether exposure conditions in a photo-printer are proper or not.

Another object of the present invention is to provide a control negative by which an accurate visual inspection can be achieved with ease at a high efficiency.

SUMMARY OF THE INVENTION

According to the present invention, a control negative for use in setting up exposure conditions for three colors in a photo-printer has at least a normal exposure frame photographed on a negative photographic film at a proper exposure, the normal exposure frame contains a density control chart having white and gray areas disposed adjacent to each other on a print formed from the normal exposure frame. The normal exposure frame further contains a center eye portion and a couple of portraits disposed on opposite horizontal sides of the center eye portion, wherein the center eye portion reproduces a neutral gray on a reference print formed from the normal exposure frame under optimum exposure conditions, and the portraits respectively have darker and lighter flesh tone faces on a print.

Using two portraits of darker and lighter flesh tones for visual inspection on the flesh tone makes it easy and reliable to determine whether the deviation in the flesh tone of the sample print is tolerable or not, compared with a case using a single portrait of standard flesh tone. Specifically, by setting up the dark and light flesh tones of the portraits on the reference print as upper and lower limits of a tolerance range for the flesh tone, an accurate determination can be made with ease as to whether and in which direction the flesh tone correction should be performed.

The normal exposure frame preferably contains a color control chart having a gray area and a color scale consisting of a series of color segments. The gray area has an equivalent neutral density to reproduce a neutral gray on the reference print. The color segments have color densities unbalanced by a constant degree from the equivalent neutral density of the gray area toward individual directions so as to have different hues from each other on the reference print.

Comparison of the color or hue of the gray area on the sample print with the colors or hues of the color segments as well as with the hue of the gray area on the reference print not only show a deviation in color balance of the photoprinter from the optimum conditions, but also show the direction of deviation, without the need for density measurement. That is, if the gray area on the sample print is not neutral but has a hue, then depending upon which color segment on the reference print is the closest in hue to the gray area on the sample print, one or two of the three color densities of printing light are shifted in necessary directions by necessary amounts to make the gray area on the sample print have the same neutral gray as on the reference print.

The normal exposure frame preferably has a background area consisting of a gray base portion and a plurality of color chips dispersed over the gray base portion. The gray base portion reproduces a neutral gray on the reference print, and each color chip has a specific color on the reference print, wherein colors, sizes and arrangement of the color chips are defined such that an average density per predetermined unit area of the normal exposure frame is equal to an equivalent neutral density of the gray base portion.

According to this arrangement, a difference in color balance between the reference print and the sample print can be obvious to the naked eye when comparing the colors of the color chips between the sample print and the reference print.

Since the colors and sizes of the color chips in the background area are determined such that the average color density per unit area of the background area is equal to the equivalent neutral density of the gray base portion, the color chips would not adversely affect the area density measurement of the frame or the print.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
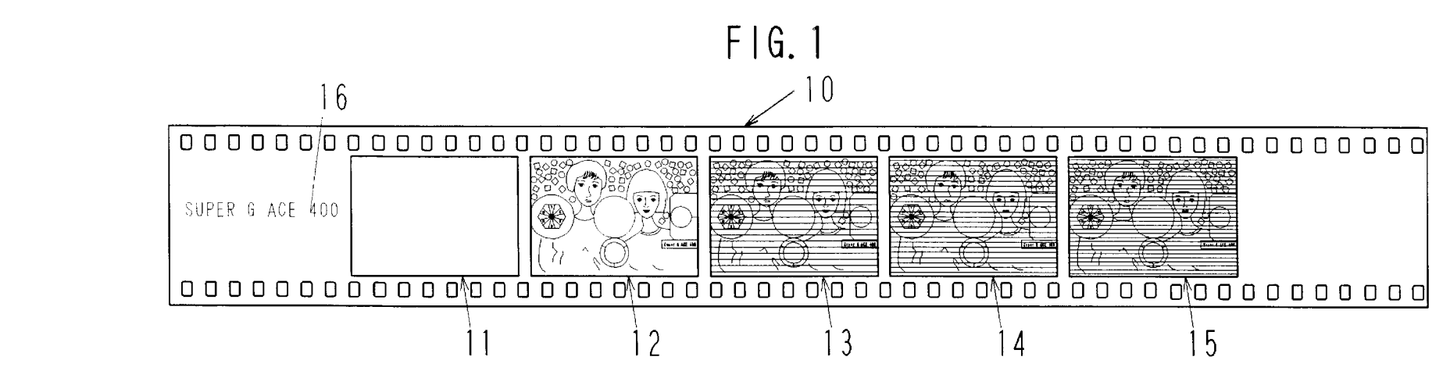
FIG. 1 schematically shows a control negative kit according to a preferred embodiment of the invention.

In FIG. 1, control negative kit 10 according to a preferred embodiment of the invention is a series of frames 12 to 15 containing the same image which are photographed on a negative filmstrip at different exposure values, wherein the frames 12 to 15 are respectively an under-exposed frame, a normal exposure frame, an over-exposed frame, and a super over-exposed frame. There is also a blank frame 11 having no image to represent a basic density of the filmstrip. The control negative kit 10 is provided for each type of negative film. Designated by 16 is indicia indicating the type of the designated negative film.

Figure 2:
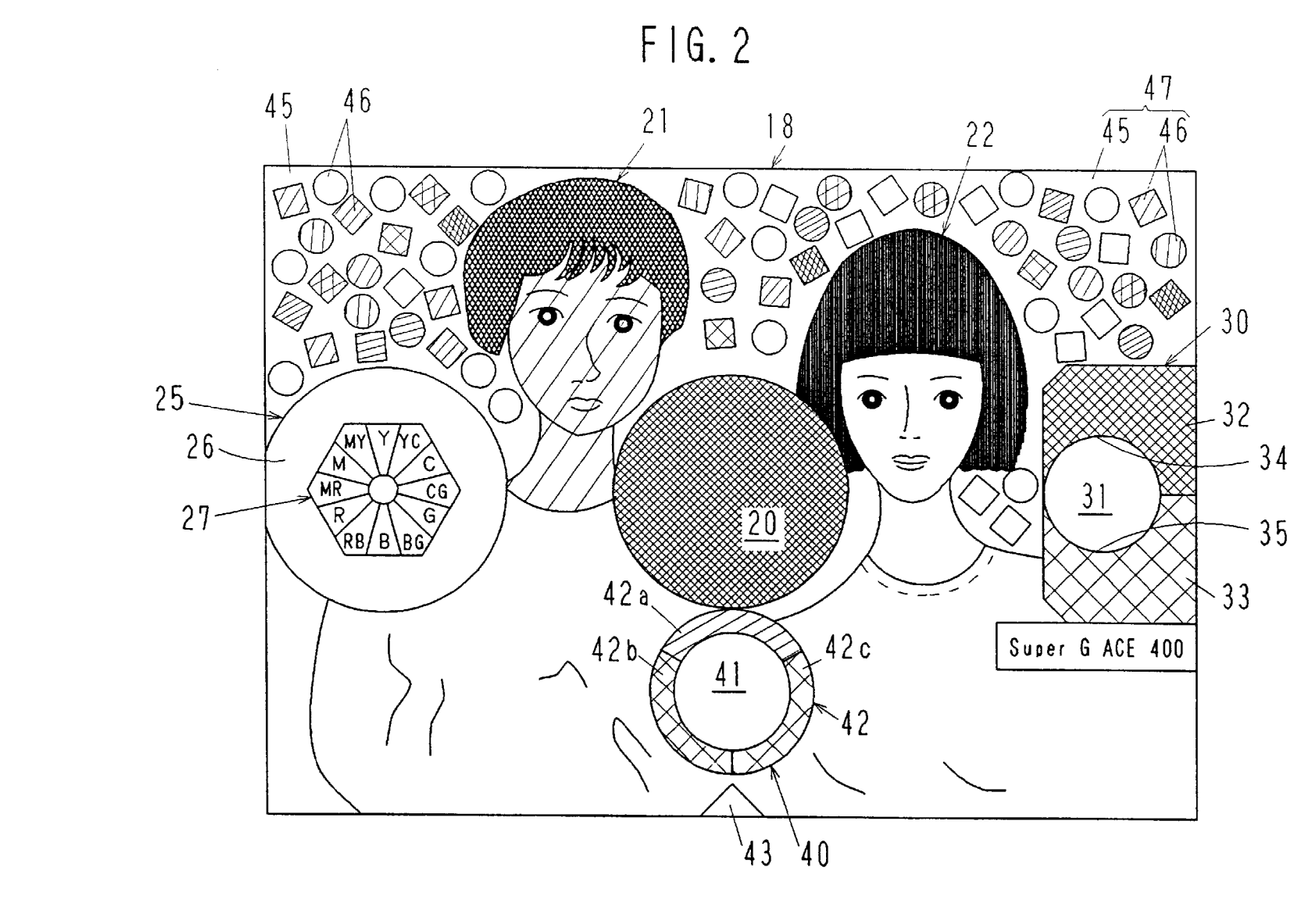
FIG. 2 shows an explanatory view of a positive image of a sample print made from a normal exposure frame of the control negative kit of FIG. 1.

Since the image of each frame of the control negative kit 10 is a negative image that is difficult to illustrate, the frames 12 to 15 shown in FIG. 1 do not show the detail of their images, but the total or average densities of the respective images. Because a positive image is convenient to explain the inventive feature, the following description will be based on a positive image of a print 18 made from the normal exposure frame 13, as shown in FIG. 2. When the normal exposure frame 13 is printed under optimum exposure conditions, a reference print is provided. To obtain a sample print for setting up exposure conditions in a photo-printer, the normal exposure frame 13 is printed under initial exposure conditions, i.e. without effecting any exposure correction in the photo-printer. In the following description about respective elements of the normal exposure frame 13, "density" means the density on the reference print. Also, the gradation will be described with reference to the prints made from the normal print 13. The order of densities in the frames 12 to 15 is reverse to that shown in the print 18. In addition, because the basic density of the negative film 10 is different according to the film type, the densities of the respective elements of the normal exposure frame 13 or other frame vary depending upon the film type.

In a center area of the normal exposure frame 13, there is an eye portion 20 which is round in the same way as the conventional control negative. The eye portion 20 has a uniform neutral gray density in the reference print. For example, the eye portion 20 in the reference print is determined to have a neutral density of 0.7: yellow (Y)=0.7, magenta (M)=0.7, cyan (C)=0.7. The neutral density of the eye portion 20 in the reference print may change in a range from 0.6 to 0.9 according to the photo-printer type. The eye portion 20 is used for measuring three color densities of a sample print made from one of the frames 12 to 15 and that of the reference print.

On opposite sides of the eye portion 20 are disposed a couple of portraits 21 and 22, of which the left one 21 will have a face of darker flesh tone on the print 18, while the right one 22 will have a face of lighter flesh tone on the print 18. The dark flesh tone of the portrait 21 is 10% darker than a standard flesh tone, whereas the light flesh tone of the portrait 22 is 10% lighter than the standard flesh tone. But this ratio may change appropriately. These two portraits 21 and 22 are helpful for visual inspection on the density and color balance of the sample print, especially with respect to the flesh tone.

A color control chart 25 is disposed on the left side of the portrait 21 in the same horizontal line as the eye portion 20. As shown in detail in FIG. 3, the color control chart 25 is constituted of a color scale 27 and a circular gray area 26 surrounding the color scale 27. The gray area 26 is designed to be neutral gray on the reference print. For example, the gray area 26 in the reference print is determined to have an equivalent neutral density of 0.7: yellow (Y)=0.7, magenta (M)=0.7, cyan (C)=0.7. The equivalent neutral density of the gray area 26 in the reference print may change in a range from 0.6 to 0.9 according to the photo-printer type.

Figure 3:
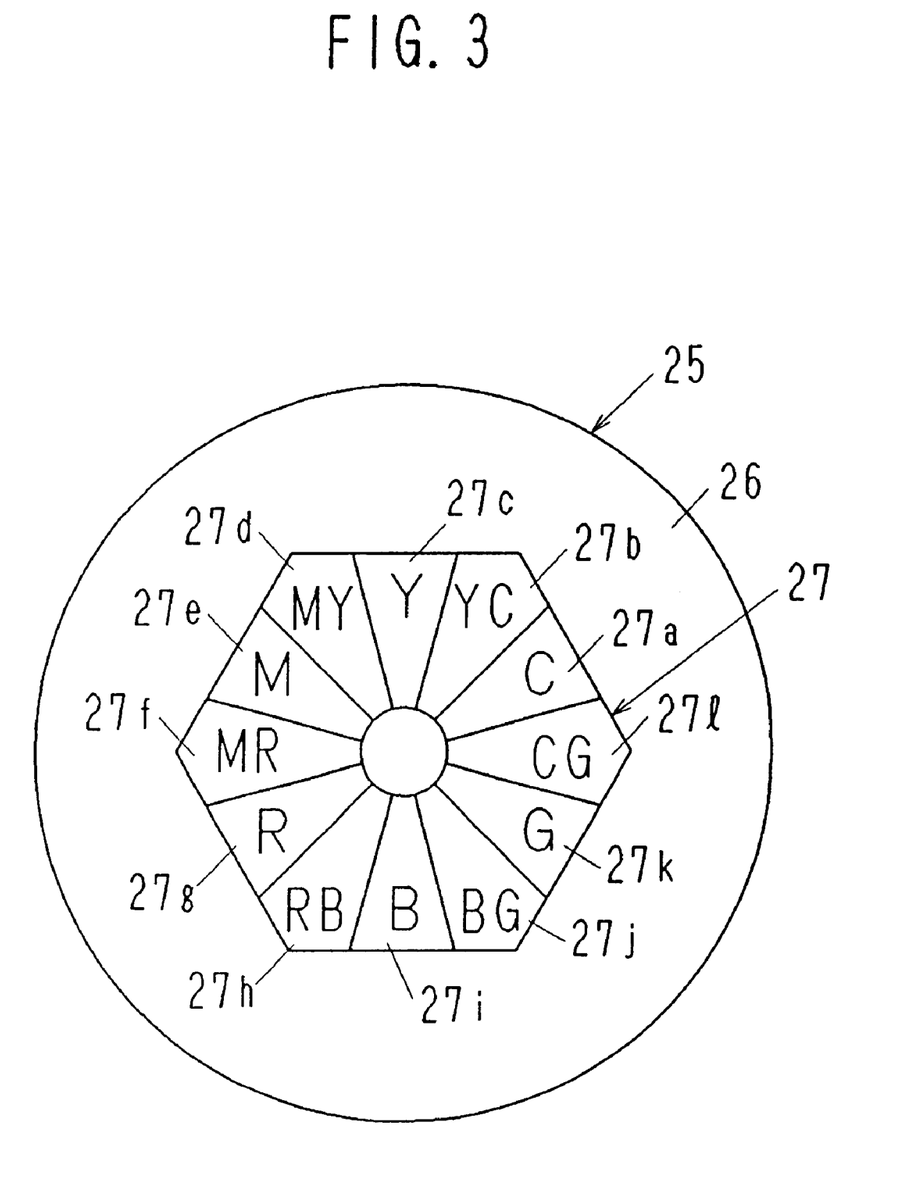
FIG. 3 an enlarged explanatory view of a color control chart shown in FIG. 2.

The color scale 27 is constituted of twelve color segments 27a to 27l whose three color densities are unbalanced toward C, YC, Y, YM, M, MR, R, RB, B, BG, G and CG, from the neutral density of the gray area 26. According to the present embodiment, cyan, yellow or magenta density of the color segment 27a, 27c or 27e is 10% increased relative to that of the gray area 27, respectively. As conventional, R, G and B represent red, green and blue, which are complementary to Y, M and C, respectively. That is, cyan, yellow or magenta density of the color segment 27g, 27i or 27k is 10% decreased relative to that of the gray area 26, respectively. In the same way, three color densities of each of the color segments 27b, 27d, 27f, 27h, 27j and 27l are determined to reproduce an intermediate hue of the adjacent color segments.

Comparison of the color or hue of the gray area 26 on the sample print with the colors or hues of the color segments 27a to 27l as well as with the hue of the gray area 26 on the reference print not only show a deviation in color balance of the photo-printer from the optimum conditions, but also show the direction of deviation, i.e., the direction of necessary correction, without the need for density measurement. According to the result of the visual inspection, one or two of the three color densities of printing light are shifted in necessary directions by necessary amounts so that the gray area 26 of the sample print may have the same color as that of the reference print.

Referring again to FIG. 2, a density control chart 30 is disposed on the right side of the portrait 22 in the same horizontal line as the eye portion 20. The density control chart 30 is constituted of a round white area 31 and upper and lower gray areas 32 and 33 disposed over and under the white area 31. For example, the upper gray area 32 have a neutral density D1 of 0.4 on the reference print, whereas the lower gray area 33 have a neutral density D2 of 0.3 on the reference print. Needless to say, the density of the white area 31 on the reference print is zero.

To determine if the density of the sample print is proper or not, contrast between the white area 31 and the upper and lower gray areas 32 and 33 is compared with that of the reference print.

There is also a second density control chart 40 below the eye portion 20, which is provided for density inspection and control in a half-size print. The second density control chart 40 is constituted of a round white area 41 and a circular gray scale 42 consisting of three segments 42a to 42c of different densities. The distinctness between the white area 41 and the respective gray scale segments 42a to 42c is inspected to determine if the density of the half-size print is proper or not. A triangular mark 43 below the second density control chart 40 is a positioning mark for half-size printing.

A background area 47 behind the eye portion 20, the portraits 21 and 22, the color control chart 25 and the density control chart 30, is constituted of a gray base portion 45 and a plurality of color chips 46 which are dispersed over the gray base portion 45. Each color chip 46 is square or round, and has a specific color on the reference print. And more than one of the color chips 46 has the same color, and those having the same color are dispersed over the gray base portion 45.

The colors, sizes and arrangement of the color chips 46 are determined such that three color densities measured by a scanner may not be unbalanced in any portion of the background area 47. For instance, if the scanner measures the three color densities of the normal exposure frame 13 of the control negative kit 10 per unit area of 10 mm$^2$, each color chip 46 should be 3 mm$^2$ or less on the frame 13, and the colors and sizes of the color chips 46 disposed in the unit area (or pixel) are determined such that the area or average color density of each pixel may be equal to an equivalent neutral density of the gray base portion 45.

According to this arrangement, a difference in color balance between the reference print and a sample print can be obvious to the naked eye when comparing the colors of the color chips 46 between the sample print and the reference print. Because too small color chips would be hard to inspect their colors, the minimum length of each color chip 46 should preferably be not less than 1 mm, and more preferably not less than 2 mm.

Figure 4:
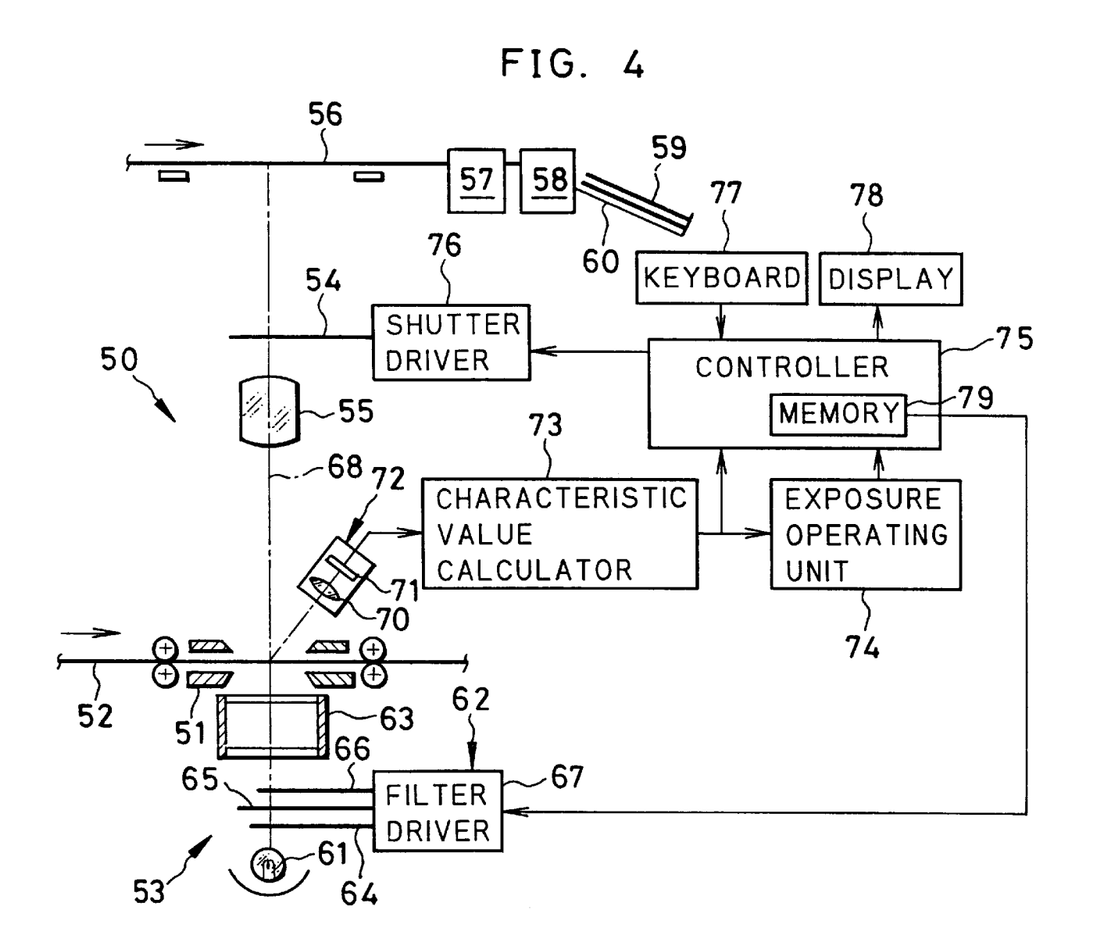
FIG. 4 schematically shows the overall construction of a photo-printer.

FIG. 4 shows a conventional photo-printer 50 with a paper processing section, called printer-processor. In the photo-printer 50, a negative film 52 is intermittently transported through a film carrier 51 so as to place a frame to be printed in a printing position in the film carrier 51. The frame placed in the printing position is illuminated by a light source 53. While a shutter 54 is open, light bundles passing through the frame are focused through a printing lens 55 onto a photographic color paper 56 to print an image of the frame on the color paper 56. The color paper 56 is temporarily stored in a reserving portion 57, and then subjected to a photofinishing process in a paper processor 58. The finished color paper 56 is cut into individual pieces of photo-prints 59, which are ejected to a tray 60.

The light source 53 is constituted of a lamp 61, a light control section 62 and a mixing box 63. The light control section 62 controls color balance and intensity of light by adjusting the amount of insertion of each of cyan, magenta and yellow filters 64, 65 and 66 into a printing light path 68 through a filter driver 67.

An image scanner 72 constituted of a lens 70 and a color image sensor 71 is disposed to face the frame placed in the printing position. The scanner 72 measures three color separation densities of respective pixels of the frame to be printed. The measured density values are sent to a characteristic value calculator 73 to derive characteristic values such as the large area transmittance density (LATD), the lowest density, the highest density and so forth. Also, the characteristic value calculator 73 makes a conventional scene-classification by use of the three color separation densities, and calculates exposure correction values according to a formula predetermined for each class of the scenes. The characteristic values and the exposure correction values are sent to an exposure operating unit 74, which then calculates a print-exposure from these values according to a conventional formula. The print-exposure is sent to a controller 75.

The controller 75 may be a well-known microcomputer, and sequentially controls respective portions of the photo-printer 50. The controller 75 determines the insertion amounts of the three color filters 64 to 66 based on the print-exposure, and controls the filter driver 67 of the light control section 62 correspondingly. The controller 75 controls a shutter driver 76 to open the shutter 54 for a determined time. Thus, an image of the frame placed in the printing position is formed through the printing lens 55 onto the color paper 56 for a proper exposure time. A keyboard 77 and a display 78 are connected to the controller 75, so as to permit manual switching of printer-modes and entering commands or data.

Figure 5:
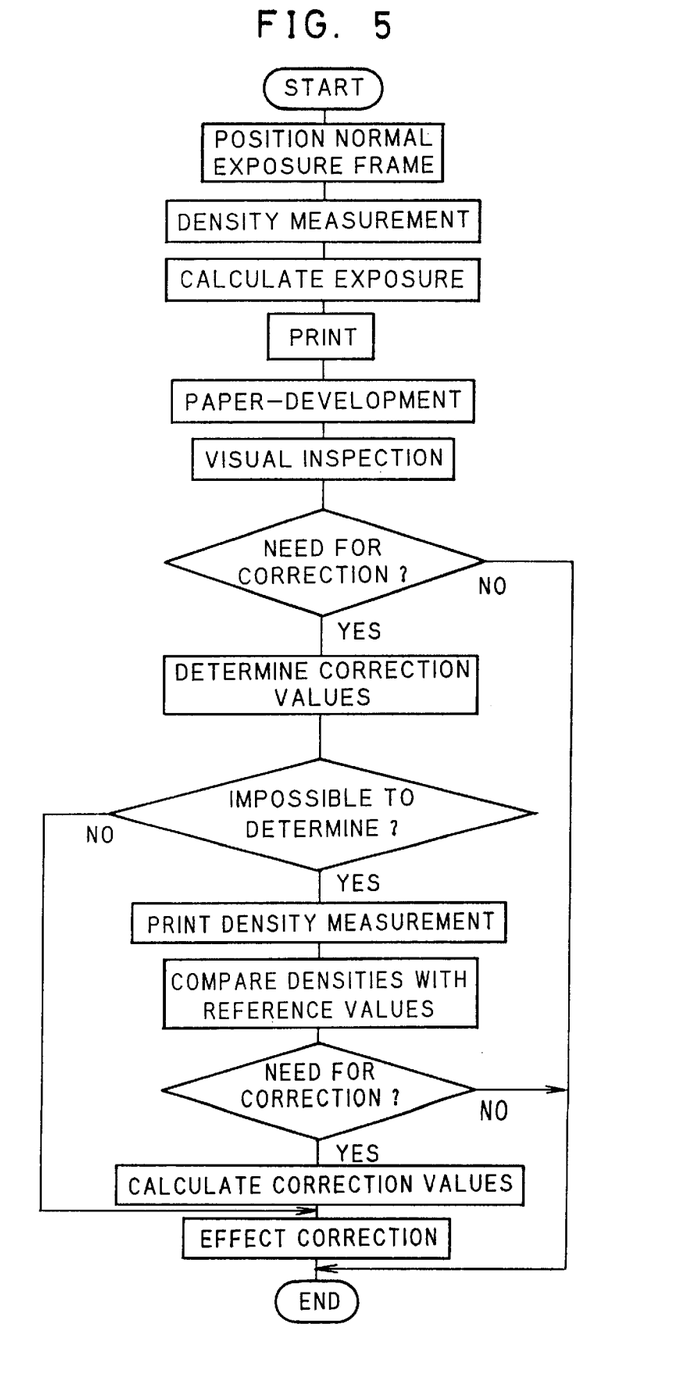
FIG. 5 is a flow chart illustrating a sequence of setting up exposure conditions for three colors in the photo-printer.

When setting up exposure conditions for three colors in the photo-printer 50 by use of the control negative kit 10, the operator sets the controller 75 to an exposure condition set-up mode through the keyboard 77. Then, the controller 75 starts setting up exposure conditions according to a sequence, for example, as shown in FIG. 5. In the exposure condition set-up mode, there are "master balance set-up mode", "paper balance set-up mode" and "lens board balance set-up mode". The master balance set-up mode is for routinely checking and correcting three color balance of the photo-printer itself. The paper balance set-up mode is for checking and correcting three color balance according to the type of photographic paper 56. The lens board balance set-up mode is for checking and correcting three color balance when the printing lens 55 is changed.

First, the control negative kit 10 is inserted in the film carrier 51 to place the normal exposure frame 13 in the printing position. Next, an area transmittance density of the normal exposure frame 13 is measured for each color by the scanner 72 without effecting the scene-classification and corresponding exposure correction. Since the colors and sizes of the color chips 46 in the background area 47 are determined such that the average color density per unit area of the background area 47 is equal to the equivalent neutral density of the gray base portion 45, the color chips 46 would not adversely affect the area transmittance density measurement.

The area transmittance density of the normal exposure frame 13 is calculated for each color in the characteristic value calculator 73, and is sent to the exposure operating unit 74. The exposure operating unit 74 calculates a print-exposure from the area transmittance densities of three colors, and sends it to the controller 75. The controller 75 determines the insertion amounts of the three color filters 64, 65 and 66 based on the print-exposure, and controls the light control section 62 correspondingly. When calculating the print-exposure, no exposure correction according to the scene-classification is effected. Thereafter, the shutter 54 is opened for a given time to print the image of the normal exposure frame 13 on the color paper 56. The printed image is developed and finished in the paper processor 58, providing a sample print.

The operator compares the dark and light flesh tones of the portraits 21 and 22 on the sample print with those on the reference print. If the dark and light flesh tones on the sample print look identical to the dark and light flesh tones on the reference prints, respectively, then the operator checks the print density from another viewpoint with reference to the density control charts 30 and 40. If the dark flesh tone of the portrait 21 on the sample print looks darker than the dark flesh tone on the reference print, or if the light flesh tone of the portrait 22 on the sample print looks lighter than the light flesh tone on the reference print, the operator determines a density correction value necessary for correcting the flesh tones to be identical to those on the reference print. For example, in the master balance set-up mode, a master balance value memorized in the controller 75 is corrected with the correction value.

In this way, using two portraits 21 and 22 of darker and lighter flesh tones for visual inspection on the flesh tone makes it easy and reliable to determine whether the deviation in the flesh tone of the sample print is tolerable or not, in comparison with a case using a single portrait of standard flesh tone. Specifically, by setting up the dark and light flesh tones of the portraits 21 and 22 on the reference print as upper and lower limits of a tolerance range for the flesh tone, e.g., ±10% around a standard flesh tone, an accurate determination can be made with ease as to whether and in which direction the flesh tone correction should be performed.

Moreover, the operator may determine without the reference print if the color balance and density of the sample print is proper or not. That is, if the dark flesh tone of the portrait 21 looks too dark on the sample print, or if the light flesh tone of the portrait 22 looks too light on the sample print, the operator may effect density correction in a corresponding direction to the photo-printer.

Visual inspection on the density control chart 30 is dependent on whether borders 34 and 35 between the white area 31 and the gray areas 32 and 33 on the sample print have the same contrast as on the reference print. If the border 34 between the white area 31 and the darker gray area 32 has the same contrast as on the reference print, the print density may be considered to be below an upper limit of a density tolerance range. If the border 35 between the white area 31 and the lighter gray area 33 is distinct, the print density may be considered to be above a lower limit of the density tolerance range. If either of the borders 34 and 35 is different in contrast from that of the reference print, the exposure conditions of the photo-printer should be corrected. For example, three color densities of printing light are shifted in the same direction by the same amount.

Thus, whether the sample print is too light or not can be determined based on the contrast of the border 35 between the white area 31 and the lighter gray area 33, it is unnecessary to compare the sample print with the reference print in this respect.

Since the densities of the white area 31 and the gray areas 32 and 33 on the normal exposure frame 13 are so defined that the difference in density between the white area 31 and the gray area 32 and that between the white area 31 and 33 become 0.3 and 0.4 on the reference print, respectively, a simple and accurate inspection is possible with the naked eye.

Then, it is determined with reference to the color control chart 25 if it is necessary to correct color balance. Specifically, the operator compares the color or hue of the gray area 26 on the sample print with the colors or hues of the color segments 27a to 27l as well as with the hue of the gray area 26 on the reference print. If the gray area 26 on the sample print is not neutral but has a hue, then depending on which color segment of the color scale 27 on the reference print is the closest in hue to the gray area 26 on the sample print, one or two of the three color densities of printing light are shifted in necessary directions by necessary amounts to make the gray area 26 on the sample print have the same color as on the reference print.

In this way, it is possible to determine the direction and amount of the deviation in color balance from the proper condition with the naked eye.

Because the eye portion 20, the color control chart 25 and the density control chart 30 are disposed in the same horizontal line that extends across a center of each frame of the control negative kit 10, and the portraits 21 and 22 are disposed on opposite horizontal sides of the eye portion 20, the above-described configuration according to the present invention the control negative frames is applicable to a horizontally elongated frame or a frame having a larger aspect ratio, such as a panoramic size or wide-vision size frame. The control negative according to the above embodiment is preferable also for use in a conventional round-exposure method.

The operator also compares the colors of the color chips 46 in the background area 47 between the sample print and the reference print. Because more than one of the color chips 46 has the same color, and those having the same color are dispersed over the gray base portion 45, color matching of each color between the sample print and the reference print is possible even if the sample print should have color unevenness that can be caused by paper processing failure.

Thus, the single sample print from the normal exposure frame 13 permits visual inspections of the printer conditions from various points of view. If it is determined that the sample print is proper in density and color balance as the result of visual inspection of the portraits 21 and 22 and the density control chart 30, as well as the color control chart 25 and the color chips 46, it is possible to omit measuring densities of the sample print and the reference prints, and calculating correction values based on the difference in measured densities. Therefore, the control negative kit 10 remarkably improves the efficiency and accuracy of visual inspection.

If, however, it is difficult to determine accurate correction values through the visual inspection, the sample print is subjected to the next density measuring process.

First, an instruction to measure the density of the reference print is displayed on the display 78. Upon operating a measurement start key after positioning the reference print in a density measuring device which is attached to the photo-printer, three color densities are measured from a center area of the reference print. The three color densities are displayed on the display 78 and, simultaneously, memorized in a memory 79 of the controller 75.

Next, an instruction to measure the density of the sample print is displayed on the display 78. The sample print is then placed in the density measuring device to measure and memorize three color densities of the sample print, which are also displayed on the display 68.

The controller 75 compares the densities of the reference print with those of the sample print, and the differences in three color densities are displayed. If any of the differences is above a predetermined value, the operator enters a correction command through the keyboard 77, whereupon the controller 75 calculates correction values and corrects a master balance value with the correction values when it is in the master balance set-up mode. In the paper balance set-up mode or the lens board balance set-up mode, a paper balance value or a lens board balance value is corrected respectively in the same way as for the master balance value. The master balance value, the paper balance value, and the lens board balance value are stored in the exposure operating unit 74.

Other frames 11, 12, 14 and 15 of the control negative kit 10 may be used for detecting a ratio of change in density of each color relative to the change of exposure values. Based on the detected ratio, an exposure correction coefficient is determined for each color, in a conventional manner.

The densities, sizes and arrangement of the density control chart 30 are not limited to the embodiment shown in FIG. 2, but may be modified appropriately so far as contrast between a white area and a gray area is useful for visual inspection on the print density, i.e., so far as the degree of deviation from a proper contrast on the reference print is visible.

Figure 6:
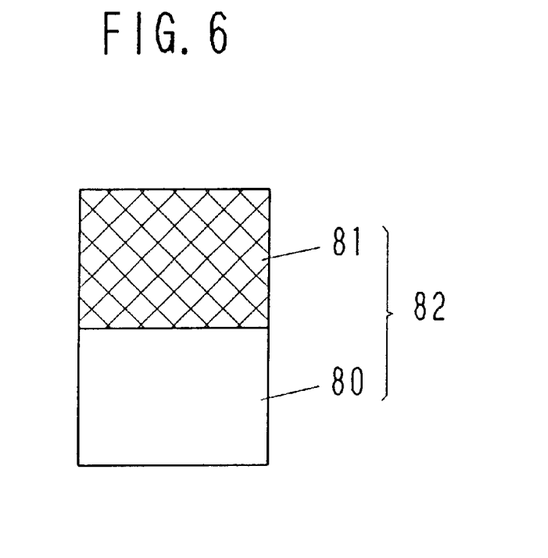
FIG. 6 shows an enlarged explanatory view of a total density checking scale contained in a control negative according to another embodiment of the invention.
Figure 7:
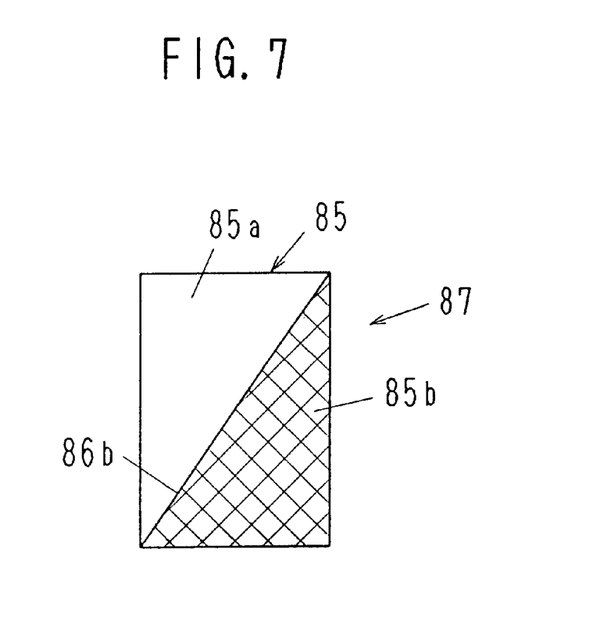
FIG. 7 shows an enlarged explanatory view of a total density checking scale according to a further embodiment of the invention.

For example, as shown in FIG. 6, it is possible to arrange a couple of rectangular white and gray areas 80 and 81 adjacent to each other to form a density control chart 82. The areas 80 and 81 may be arranged horizontally as well as vertically. Alternatively, it is possible to form a density control chart 87 by dividing a rectangular area 85 into triangular white and gray areas 85a and 85b, as shown in FIG. 7.

Figure 8:
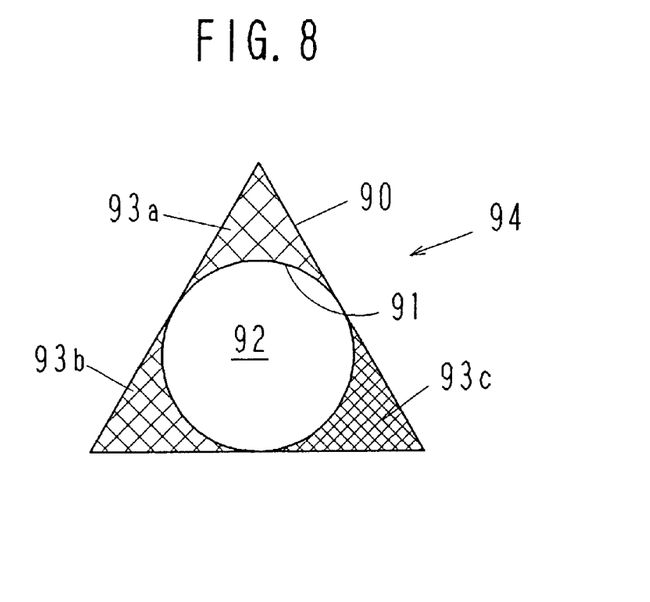
FIG. 8 shows an enlarged explanatory view of a total density checking scale according to still another embodiment of the invention.

FIG. 8 shows a density control chart 94 according to another embodiment, which consists of a regular triangle 90 and an inscribed circle 91. The inside 92 of the circle 91 serves as a white area 92, and peripheral three segments 93a, 93b and 93c in the triangle 90 serve as gray areas 93a, 93b and 93c of three different densities.

Figure 9:
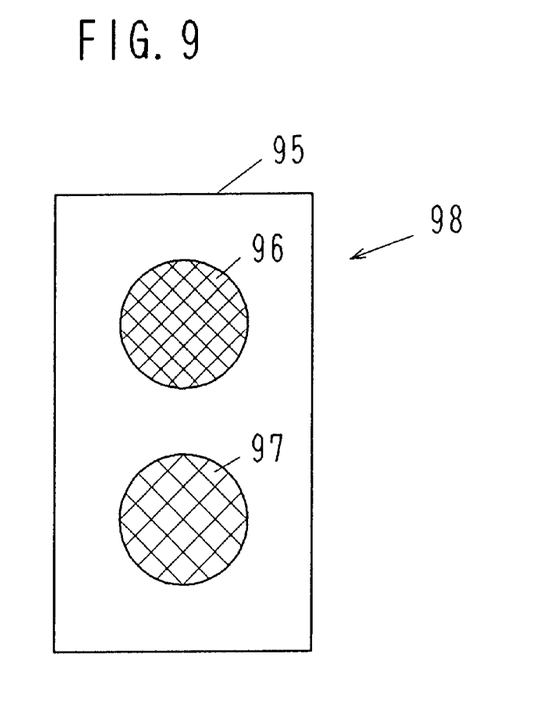
FIG. 9 shows an enlarged explanatory view of another embodiment of total density checking scale.

It is also possible to construct a density control chart 98 by a rectangular white area 95 and two round gray areas 96 and 97 disposed inside the white area 95, as shown in FIG. 9. The gray areas 96 and 97 are not determined to be round, but may be triangular, rectangular, polygonal or any other shape.

Figure 10:
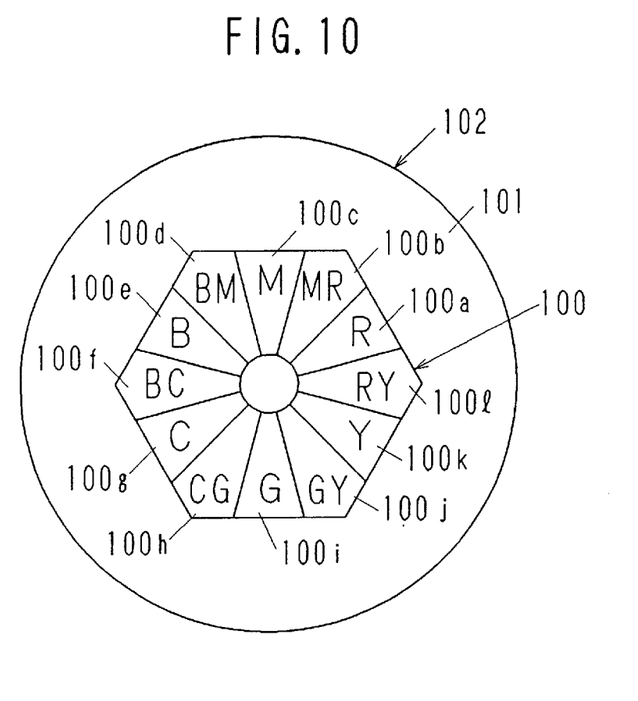
FIG. 10 shows an enlarged explanatory view of a color control chart contained in a control negative according to another embodiment of the invention.

Also the color control chart 25 shown in FIG. 3 is not limitative, but may be modified, for example, as shown in FIG. 10. In this embodiment, a color scale 100 has twelve radial color segments 100a to 100l, of which those having hues of complementary colors R to C, G to M, and B to Y are disposed symmetrically about the axial center of the color scale 100, while other segments 10b, 100d, 100f, 100h, 100j and 100l having intermediate hues MR, BM, BC, CG, GY, RY are disposed intermediately. A circular gray area 101 surrounds the color scale 100 to form a color control chart 102.

Although the color scales 100 and 27 are hexagonal, they may be circular, oval, triangular, or have another polygonal shape or indeterminate form. It is possible to arrange color segments of a color scale around a center gray area. It is also possible to arrange color segments of a color scale in a line along a rectangular gray area.

Figure 11:
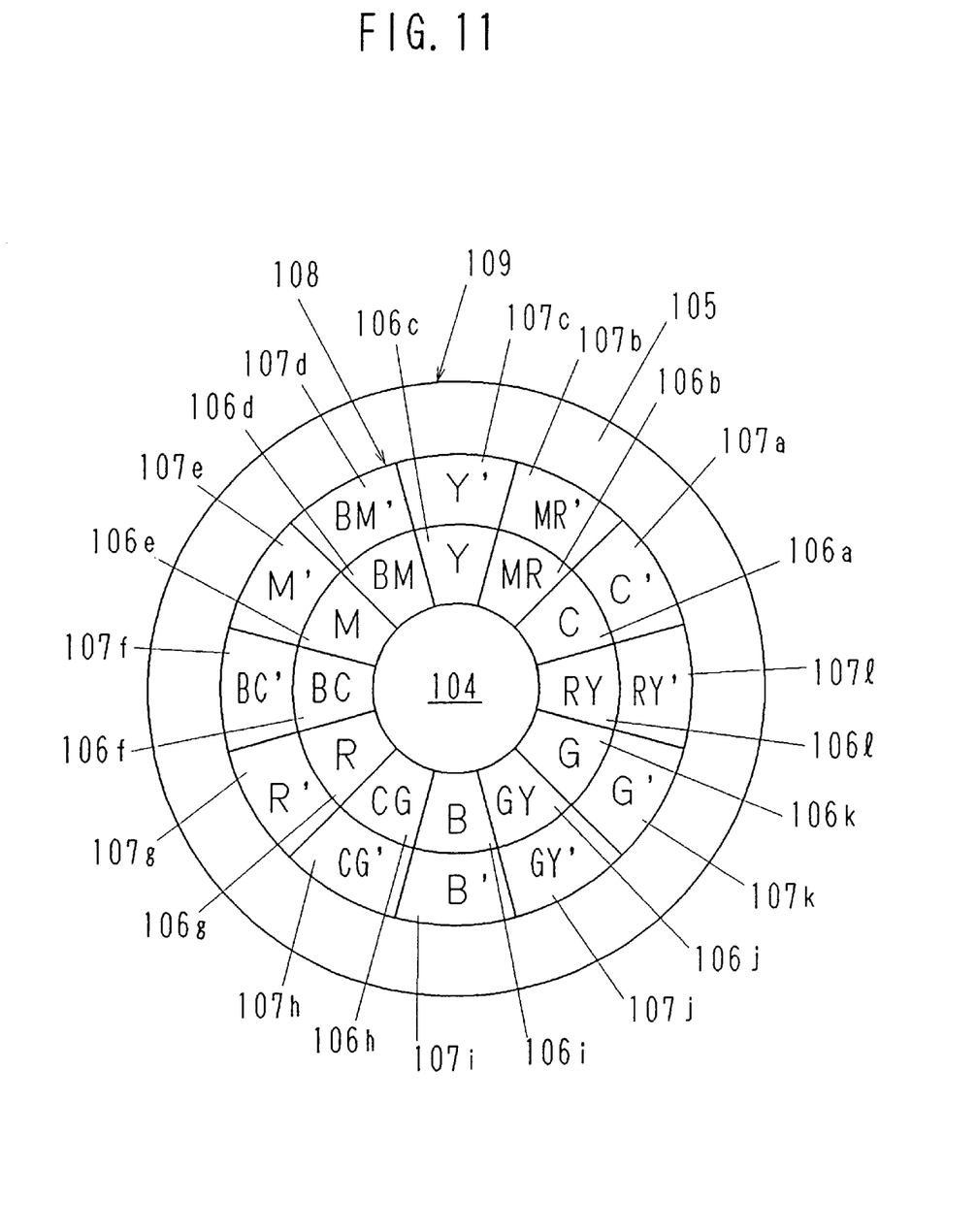
FIG. 11 shows an enlarged explanatory view of a further embodiment of color control chart.

FIG. 11 shows a color control chart 109 according a more preferable embodiment, which is constituted of a center gray area 104, a circumferential gray area 105, and a color scale 108 with two circles of color segments 106a to 106l and 107a to 107l. Color balance of each color segment 106a to 106l, 107a to 107l of the color scale 108 is unbalanced toward a specific hue as indicated in FIG. 11, relative to an equivalent neutral density of the gray areas 104 105, wherein a pair of color segments disposed in the same radial line are deviated in the same direction from the neutral gray of the gray areas 104 and 105, but the degree of deviation is different from each other. For example, the color segments 106a to 106l of the inner circle are less deviated from the neutral gray, compared with the outer circle segments 107a to 107l. Therefore, the stronger hues of the outer circle segments 107a to 107l are indicated by color initials C', MR', Y', BM', M', BC', R', CG', B', GY', G' and RY'. This embodiment facilitates determination of the necessary amount of color balance correction.

It may be possible that the gray areas 104 and 105 have different neutral densities, and that color balance of each color segment 106a to 106l of the inner circle is determined to be deviated by a constant degree from the neutral gray of the center gray area 104, while color balance of each color segment 107a to 107l of the outer circle is deviated at the constant degree from the neutral gray of the circumferential gray area 105.

Figure 12:
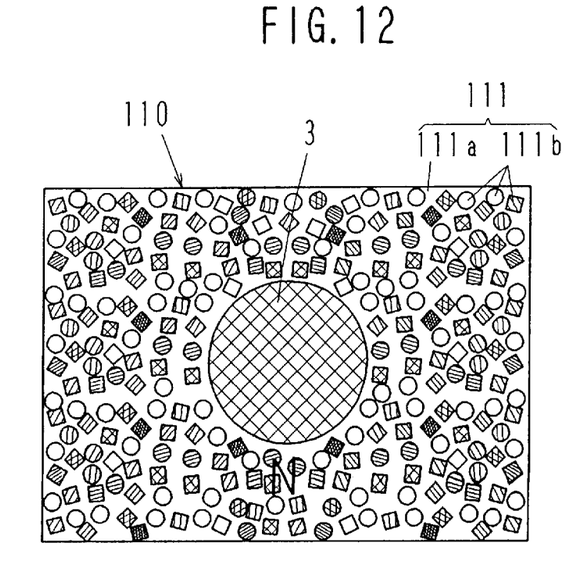
FIG. 12 shows an explanatory view of a control negative according to still another embodiment of the invention.

FIG. 12 shows a control negative 110 according to a further embodiment of the present invention, which consists of a center eye portion 3 and a background area 111. The eye portion 3 is designed to have a neutral gray in a reference print made from the control negative 110 at an optimum exposure condition, as the conventional control negative. The background area 111 consists of a gray base portion 111a and a large number of color chips 111b having different colors. The colors and sizes of the color chips 111b are determined such that the average or area color density of each pixel of the background area 111 may be equal to an equivalent neutral density of the gray base portion 111a, so that the color chips 111b may not adversely affect density measurement.

According to this embodiment, whether color balance is proper or not can be determined with the naked eye by comparing the colors of the color chips 111b between the sample print and the reference print. Because more than one of the color chips 111b has the same color, and those having the same color are dispersed over the gray base portion 111, color matching of each color between the sample print and the reference print is possible even if the sample print should have color unevenness that can be caused by paper processing failure.

The control negatives of the present invention are useful for controlling brightness and color balance of a display device such as a CRT monitor. For this purpose, the control negative is imaged on the display device, and the gradation and color balance of the displayed image are adjusted by operating brightness and color balance control knobs of the display device.

The above embodiments have been described in relation to the 135-size negative film. But the present invention is applicable to photographic films of any type and any size, including 110-size, 120-size and a new format photographic film which has a transparent magnetic recording layer and whose leader is able to be advanced out of its cassette shell by rotating a spool of the cassette shell.

To determine if it is necessary to correct the color balance of the photo-printer, "a round exposure method" may be applicable instead of using the density measuring device. The round exposure method is a conventional method wherein a center area of a control negative frame, e.g. a normal exposure frame, is printed in succession at different exposure conditions, e.g. nine grades of exposure conditions, onto a strip of color paper to make a series of sample prints. The operator compares the sample prints with a reference print, and inputs the serial number of the most similar sample print to the reference print into the controller of the photo-printer. Then, the controller automatically corrects the color balance with correction values predetermined in accordance with the serial number. The serial numbers of the sample prints may be printed on the back of each print.

Thus, the present invention should not be limited to the above described embodiments but, on the contrary, various modifications may be possible to those skilled in the art without departing from the scope of the appended claims.

What is claimed is:

1. A control negative for use in setting up exposure conditions for three colors in a photo-printer having at least a normal exposure frame photographed on a negative photographic film at a proper exposure, said normal exposure frame comprising a density control chart, said density control chart having white and gray areas disposed adjacent to each other on a print formed from the normal exposure frame;

wherein said normal exposure frame further comprises a center eye portion and a couple of portraits disposed on opposite horizontal sides of said center eye portion, wherein said center eye portion reproduces a neutral gray on a print formed from said normal exposure frame under optimum exposure conditions and said portraits respectively have faces of different flesh tones on a print.

2. A control negative according to claim 1, wherein said white area and said gray area are designed to have a density difference of 0.4 on the print when printed under optimum exposure conditions.

3. A control negative according to claim 1, wherein said density control chart is d disposed on a horizontal center line of said normal exposure frame.

4. A control negative according to claim 1, wherein said density control chart comprises a second gray area having a different density from that of the first gray area, said second gray area being disposed adjacent to said white area, such that borders between said white area and said first and second gray areas may be used for determining whether the print has a density within a density tolerance range. print.

5. A control negative for use in setting up exposure conditions for three colors in a photo-printer having at least a normal exposure frame photographed on a negative photographic film at a proper exposure, said normal exposure frame comprising a color control chart having a gray area and a color scale consisting of a series of color segments, said gray area having an equivalent neutral density to reproduce a neutral gray on a reference print formed from said normal exposure frame under optimum exposure conditions, said color segments having color densities unbalanced by a constant degree from the equivalent neutral density of said gray area toward individual directions so as to have different hues from each other on the reference print;

wherein said normal exposure frame further comprises a center eye portion and a couple of portraits disposed on opposite horizontal sides of said center eye portion, wherein said center eye portion reproduces a neutral gray on a print formed from said normal exposure frame under optimum exposure conditions, and said portraits respectively have faces of different flesh tones on a print.

6. A control negative according to claim 5, wherein said color segments of said color scale is arranged in a circle, and said gray area is disposed adjacent to each of said color segments and coaxially with the circle of color scale.

7. A control negative according to claim 6, wherein three of said color segments whose color densities are unbalanced respectively toward cyan, magenta and yellow are disposed in a half portion of the circle, whereas those color segments which reproduce complementary hues are disposed symmetrically with said three color segments about a center axis of the circle.

8. A control negative according to claim 7, wherein a color segment which reproduces an intermediate hue is disposed between two of those color segments which reproduce hues of primary colors.

9. A control negative according to claim 6, wherein three of said color segments whose color densities are unbalanced respectively toward cyan, magenta and yellow are disposed at regular intervals around the circle, whereas those color segments which reproduce complementary hues are disposed symmetrically with said three color segments about a center axis of the circle.

10. A control negative according to claim 9, wherein a color segment which reproduces an intermediate hue is disposed between two of those color segments which reproduce hues of primary colors.

11. A control negative according to claim 5, wherein said color scale further comprises another series of color segments having color densities unbalanced by a second constant degree from the equivalent neutral density of said gray area toward individual directions so as to have stronger hues compared with the first series of color segments on the reference print.

12. A control negative according to claim 11, wherein said first and second series of color segments are arranged in two coaxial circles such that two of said color segments which reproduce the same hue are disposed in the same radial direction.

13. A control negative for use in setting up exposure conditions for three colors in a photo-printer having at least a normal exposure frame photographed on a negative photographic film at a proper exposure, said normal exposure frame comprising a center eye portion and first and second portraits disposed on opposite horizontal sides of said center eye portion, wherein said center eve portion reproduces a neutral gray on a print formed from said normal exposure frame under optimum exposure conditions, said first portrait having a face of darker flesh tone on a print, said second portrait having a face of lighter flesh tone on the print, compared with a standard flesh tone.

14. A control negative according to claim 13, wherein said normal exposure frame further comprises a center eye portion, and said couple of portraits are disposed on opposite horizontal sides of said center eye portion, wherein said center eye portion reproduces a neutral gray on a print formed from said normal exposure frame under optimum exposure conditions.

15. A control negative according to claim 13, wherein said lighter and darker flesh tones represent a lower limit and an upper limit of a tolerance range of flesh tone, respectively.

16. A control negative for use in setting up exposure conditions for three colors in a photo-printer having at least a normal exposure frame photographed on a negative photographic film at a proper exposure, said normal exposure frame comprising a background area consisting of a gray base portion and a plurality of color chips dispersed over said gray base portion, said gray base portion reproducing a neutral gray on a reference print formed from said normal exposure frame under optimum exposure conditions;

wherein said normal exposure frame further comprises a center eye portion and a couple of portraits disposed on opposite horizontal sides of said center eye portion, said portraits respectively having new faces of lighter and darker flesh tones on the reference print, compared with a standard flesh tone.

17. A control negative according to claim 16, wherein each of said color chips has a specific color on the reference print, and more than one of said color chips has the same color, and those having the same color are dispersed over the gray base portion.

18. A control negative according to claim 17, wherein colors, sizes and arrangement of said color chips being defined such that an average density per predetermined unit area of said normal exposure frame is equal to an equivalent neutral density of said gray base portion.

19. A control negative according to claim 18, wherein said normal exposure frame further comprises a center eye portion in a center area thereof, said center eye portion reproducing a neutral gray on the reference print.

20. A control negative according to claim 19, wherein said normal exposure frame further comprises a density control chart disposed in the same horizontal center line as said center eye portion, said density control chart having white and gray areas disposed adjacent to each other on a print formed from the normal exposure frame.

21. A control negative according to claim 19, wherein said normal exposure frame further comprises a color control chart disposed in the same horizontal center line as said center eye portion, said color control chart having a gray area and a color scale consisting of a series of color segments, said gray area having an equivalent neutral density to reproduce a neutral gray on a reference print formed from said normal exposure frame under optimum exposure conditions, said color segments having color densities unbalanced by a constant degree from the equivalent neutral density of said gray area toward individual directions so as to have different hues from each other on the reference print.

* * * * *